United States Patent
Maeda et al.

(10) Patent No.: US 6,841,914 B2
(45) Date of Patent: Jan. 11, 2005

(54) MOTOR WITH BRUSH AND COMMUTATOR, AND ELECTRIC APPARATUS USING THE SAME MOTOR

(75) Inventors: Kenichi Maeda, Takefu (JP); Shozo Sakon, Takefu (JP); Kazuo Toya, Moriguchi (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 10/344,331

(22) PCT Filed: Nov. 8, 2001

(86) PCT No.: PCT/JP01/09784
§ 371 (c)(1),
(2), (4) Date: Aug. 1, 2003

(87) PCT Pub. No.: WO02/39564
PCT Pub. Date: May 16, 2002

(65) Prior Publication Data
US 2004/0021394 A1 Feb. 5, 2004

(30) Foreign Application Priority Data
Nov. 10, 2000 (JP) ......................................... 2000-343285

(51) Int. Cl.[7] ......................... H02K 13/10; H02K 23/30
(52) U.S. Cl. ........................ 310/198; 310/206; 310/234
(58) Field of Search ................................. 310/206, 198, 310/128, 131, 133, 231, 233, 234, 236, 248

(56) References Cited

U.S. PATENT DOCUMENTS

| 4,404,485 A | * | 9/1983 | Ban et al. ..................... 310/198 |
| 4,437,028 A | * | 3/1984 | Ikeda .......................... 310/198 |
| 4,459,503 A | * | 7/1984 | Kropp et al. ................. 310/198 |
| 4,876,472 A | * | 10/1989 | Shiraki et al. ............... 310/198 |
| 5,202,599 A | * | 4/1993 | Kao ........................... 310/234 |

FOREIGN PATENT DOCUMENTS

| EP | 0 072 283 A | 2/1983 | .......... H02K/23/30 |
| FR | 2 705 843 A | 12/1994 | .......... H02K/13/14 |
| JP | 11-341723 A | 12/1999 | ............ H02K/3/18 |

* cited by examiner

*Primary Examiner*—Burton Mullins
(74) *Attorney, Agent, or Firm*—Rossi & Associates

(57) ABSTRACT

An arc length in contact with a commutator of two brushes in a rotational direction of a motor is defined as not more than 5% of an outer rim length or circumference of the commutator, i.e., not more than πA/2O, where A is an outside diameter of the commutator. A number of shorted segments of the commutator, which short is caused by the brush, can be minimized so that reduction in output of the motor can be prevented. As a result, the motor employed in a car product or an electric tool can be downsized and made lighter.

4 Claims, 6 Drawing Sheets

PRIOR ART

US 6,841,914 B2

MOTOR WITH BRUSH AND COMMUTATOR, AND ELECTRIC APPARATUS USING THE SAME MOTOR

TECHNICAL FIELD

The present invention relates to a motor employed in an electric apparatus such as an automotive product and an electric tool, and an electric apparatus using the same motor.

BACKGROUND ART

Recently, electric apparatuses such as an automotive product and an electric tool have been downsized and light-weighted. This market trend entails a power source of these electric apparatuses, i.e., a motor mounted to these apparatuses, to be also downsized and light-weighted.

A dc motor having brushes and a commutator is often employed to these apparatuses. The dc motor comprises the following elements in general:

a stator producing magnetic field; and a rotor facing the stator via annular space.

As the rotor, an armature including a commutator and an iron core wound with coils is employed. The armature should be powered in order to drive the dc motor. For that purpose, brushes—connected to an outer power source with lead wires—are brought into contact with the commutator.

The Japanese Patent Application Non-Examined Publication No. H11-341723 discloses one of conventional motors of this kind. FIG. 8 shows the motor disclosed, which comprises four magnetic poles, five teeth of an armature, ten segments of a commutator. The publication also discloses a method of winding coils as follows, which is illustrated in FIG. 9. The coils extended from segments of the same phase are wound on slots (teeth) of the same phase, thereby preventing the output of a motor from decreasing.

However, the structure discussed above shorts segments S2 and S3, or S5 and S6 with brush B1 or B2 depending on a position where the brushes contact with the segment. As a result, current does not run through some coils, which are marked with a circle in FIG. 8. In other words, numbers of inactive conductors are produced, thereby reducing the output of the motor, which has been an obstacle to the progress of downsizing and weight reduction of a motor.

SUMMARY OF INVENTION

The present invention addresses the problems discussed above, and aims to provide a motor downsized and light-weighted without incurring reduction in output. The present invention also aims to provide electric apparatuses downsized and light-weighted, such as car-products and electric tools, by employing the same motor.

The motor of the present invention comprises the following elements:

(a) a stator having four magnetic poles;
(b) a rotor including:
  (b-1) a core having five teeth;
  (b-2) a commutator formed of 10 segments;
  (b-3) coils wound on the teeth via lead-wires connected to the segments, and
(c) a pair of brushes orthogonally crossing with each other, and brought into contact with the commutator.

The arc length—contacting with the commutator—of the brushes in the rotational direction is defined as not more than 5% of the outer rim length of the commutator, i.e., not more than $\pi \times A/20$, where A is an outside diameter of the commutator.

This structure minimizes a number of shorts between the segments due to the brushes, thereby preventing a number of active conductors from being reduced. Further, this structure prevents, as much as possible, the current running through the coils in the same slot from flowing in a reverse direction. As a result, a motor accommodating both of downsizing and weight reduction is obtainable without lowering its output.

BEST MODE FOR CARRYING OUT THE INVENTION

Exemplary embodiments of the present invention are described hereinafter with reference to the accompanying drawings.

First Exemplary Embodiment

Figure 1:
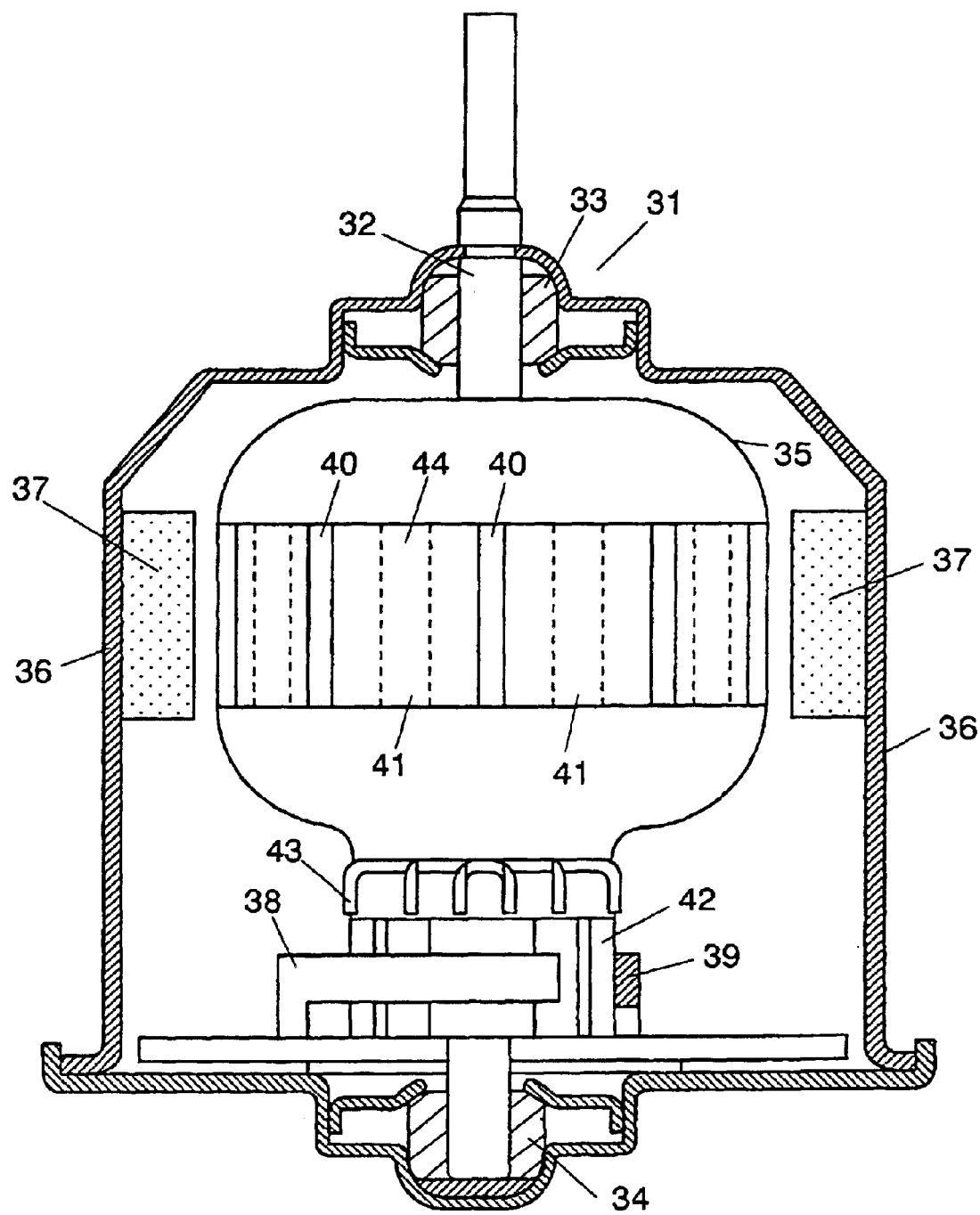
FIG. 1 shows a cross sectional view of a motor in accordance with a first exemplary embodiment of the present invention.

FIG. 1 shows a cross sectional view of a motor in accordance with the first exemplary embodiment of the present invention. In FIG. 1, motor 31 is constructed as follows:

Magnet 37 functioning as a stator is rigidly mounted onto the inner wall of frame 36 of motor 31. Frame 36 houses rotor 35, of which shaft 32 extends through the center of core 44 formed of laminated electromagnetic-steel plates. Rotor 35 is journaled by bearings 33 and 34 at both the ends of shaft 32. Rotor 35 thus faces stator magnet 37 via annular space. Rotor 35 is provided with five slots 40 parallel to the axial line of shaft 32. Five teeth 41 are formed between respective slots 40. Windings (coils) are provided on respective teeth 41. Commutator 42 comprising ten segments is rigidly mounted to one end of rotor 35. Ends of respective coils are coupled to winding connectors 43 linked to respective segments. A pair of brushes contact with commutator 42, so that commutator 42 slides with respect to the pair of brushes when rotor 35 rotates. A pair of brushes 38 and 39 crossing orthogonally with each other are connected to lead-wires (not shown) through which an outer power source (not shown) powers the coils wound on rotor 35 via commutator 42. This power feeding generates rotational force between teeth 41 of rotor 35 and magnet 37 forming magnetic field, so that rotor 35 rotates inside magnet 37 (stator).

The structures of the rotor and the stator are detailed with reference to FIG. 4, which shows a cross sectional view of the rotor taken along the face orthogonal to the section shown in FIG. 1.

Figure 4:
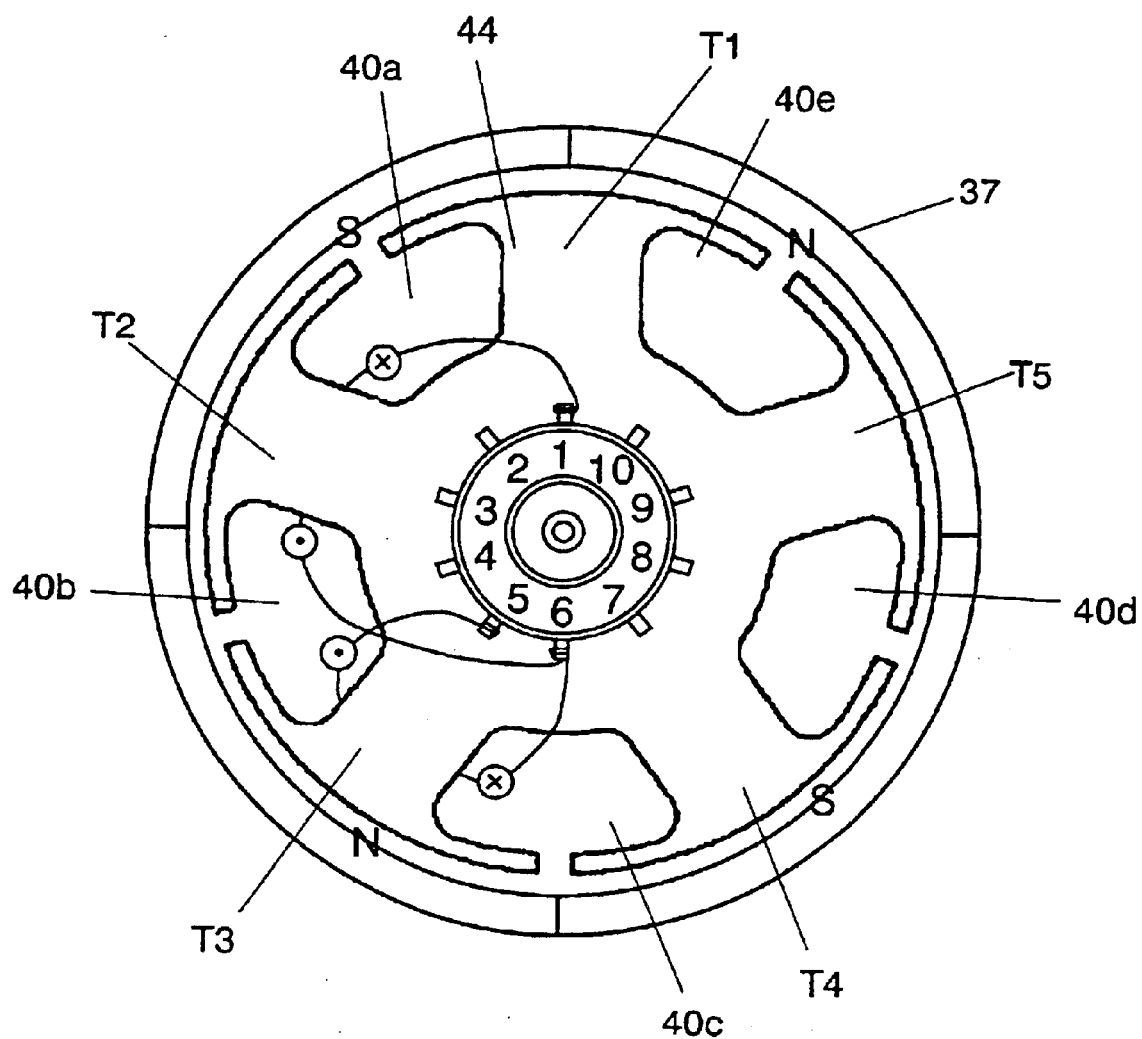
FIG. 4 illustrates a method of winding on the motor shown in FIG. 3.

In FIG. 4, the inner wall of magnet 37 is magnetized in N-S-N-S at equal intervals in the rim direction, so that magnetic field having four magnetic poles is formed. Each of five slots 40, namely 40a, 40b, 40c, 40d and 40e, is shaped in trapezoid. Between the respective slots, five teeth 41, namely T1, T2, T3, T4 and T5, are formed. Each of teeth 41 has two protrusions which cover the adjacent slots on both sides, and the sectional view of each tooth 41 looks like a T-shaped letter.

Commutator 42 has ten segments, namely segments 1–10 shown in FIG. 4. Each tooth 41 is wound with a coil for driving the motor, and each coil-end is connected to each segment.

Figure 2:
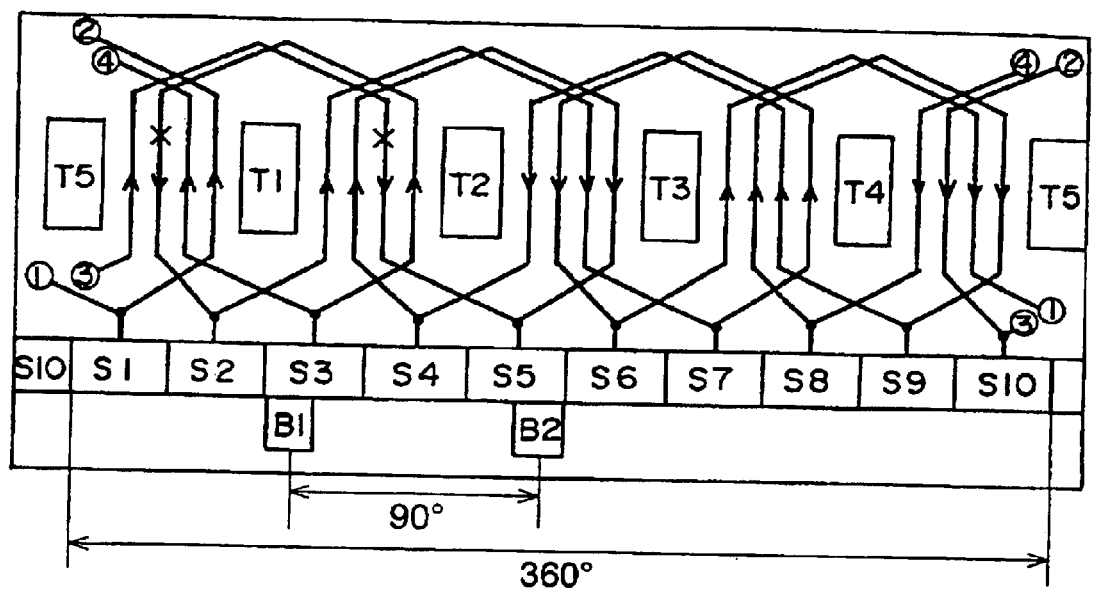
FIG. 2 shows a schematic development of a rotor of the motor in accordance with the first exemplary embodiment of the present invention.
Figure 3:
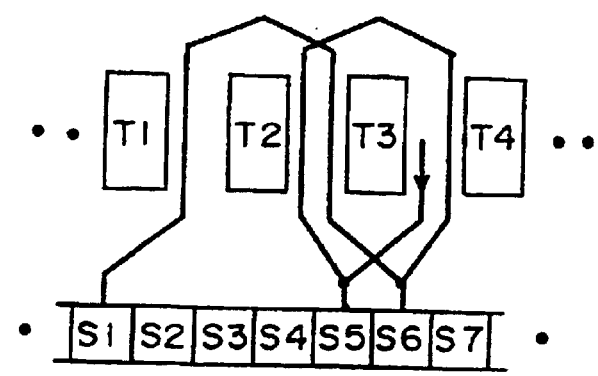
FIG. 3 shows a schematic development of windings of the motor in accordance with the first exemplary embodiment of the present invention.

FIG. 2 shows a schematic development of a rotor of the motor in accordance with the first exemplary embodiment of the present invention. FIG. 3 shows a schematic development of windings of the motor. FIG. 4 illustrates a method of winding coils on the motor shown in FIG. 3.

The motor in accordance with the first embodiment comprises the following elements:

(a) a stator having four magnetic poles;
(b) a rotor including a core having five teeth, a commutator including ten segments, and coils wound on the teeth via lead-wires connected to the segments; and
(c) a pair of brushes crossing orthogonally with each other, and contacting with the commutator.

An arc length—contacting with the commutator—of the brush in the rotational direction is defined as not more than 5% of the outer rim length of the commutator, i.e., not more than $\pi \times A/20$, where A is the outside diameter of the commutator.

FIG. 2 illustrates that brushes B1, B2 contact with only segments S3, S5 respectively. The total length of segments S1–S10 is the outer rim length of the commutator ($\pi \times A$) and corresponds to mechanical angle of 360°. Both brushes B1 and B2 are disposed such that they cross orthogonally with each other. The space between brushes B1 and B2 corresponds to mechanical angle of 90°.

Figure 8:
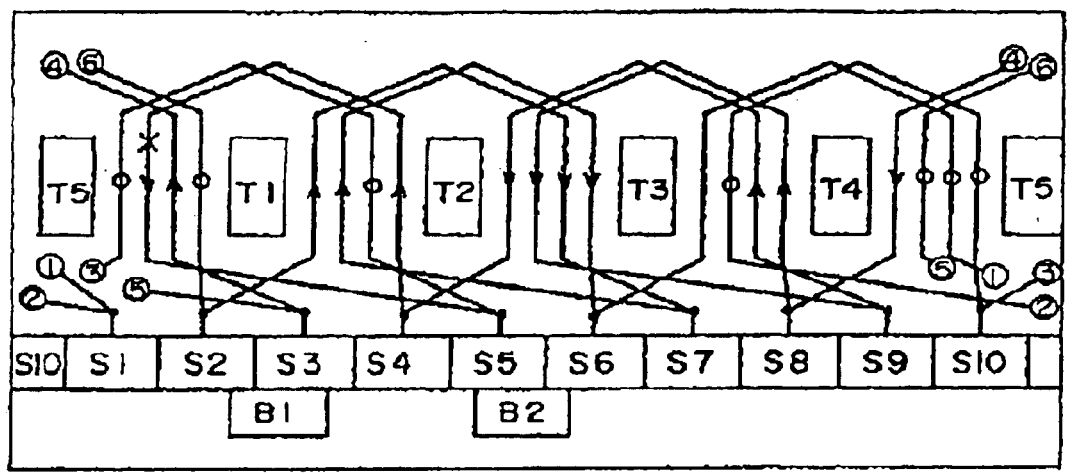
FIG. 8 shows a schematic development of a rotor of a conventional motor.

In the conventional case shown in FIG. 8, the positional relation between brushes and a rotor (i.e., a commutator) is the same as that in the first embodiment illustrated in FIG. 2. These two cases are compared for finding different results.

In the conventional case shown in FIG. 8, segment S2 is shorted with segment S3, so that the coil (marked with a circle ○) starting from S2, winding on tooth T5 and extending to S3 becomes inactive, in other words, current does not run through this coil. In same manner, segment S5 shorts with segment S6, so that the coil (marked with a circle ○) starting from S5, winding on tooth T1 and extending to S10 becomes inactive, and the coil (marked with a circle ○) starting from S10, winding on tooth T4 and extending to S1 becomes inactive. The coil (marked with a circle ○) starting from S1, winding on tooth T4 and extending to S6 becomes also inactive.

In the first embodiment illustrated in FIG. 2 of the present invention, when brush B1 applied with a positive voltage contacts with segment S3, and brush B2 applied with a negative voltage contacts with segment S5, electrical conditions of respective coils are as follows: A first current runs from B1, through S3, around T5, through S8, around T4, through S9, around T3, through S4, around T2, through S5 and arrives at B2. A second current runs from B1, through S3, around T1, through S2, around T2, through S7, around T3, through S6, around T4, through S1, around T5, through S10, around T1, through S5 and arrives at B2.

In the first and the second current-routes, current runs in the reverse direction in a few coils (marked with ×); however, no inactive coils are found, which proves that reduction in active conductors of the first embodiment is smaller than that of the conventional case shown in FIG. 8.

Figure 5:
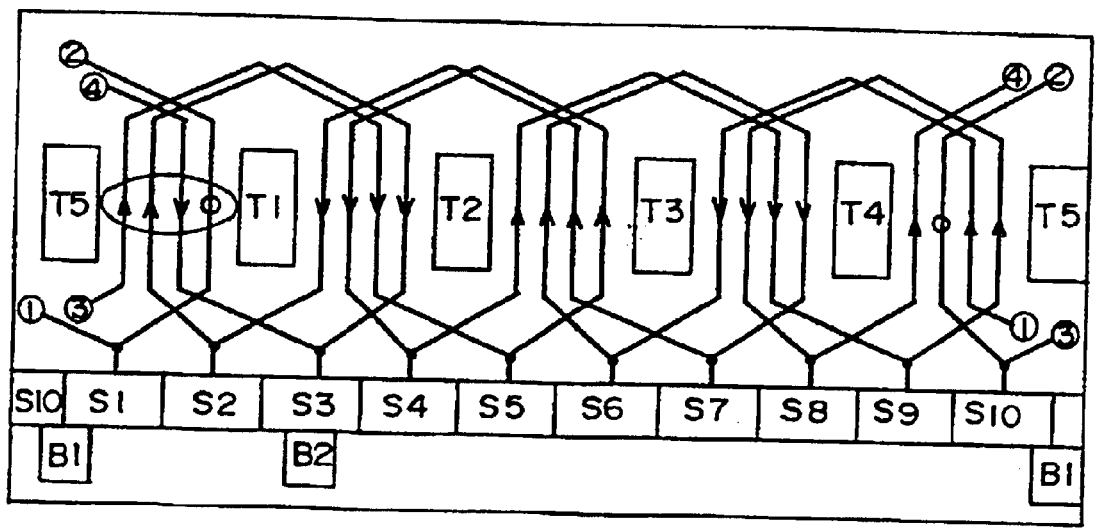
FIG. 5 shows a schematic development of a rotor where contact position between a brush and a commutator of the motor in accordance with the first exemplary embodiment of the present invention differs from that showed in FIG. 2.

FIG. 5 shows a schematic development of the rotor, where another case of the first embodiment is illustrated, i.e., a contacting position of the commutator and the brushes are different from that shown in FIG. 2. In FIG. 5, when brush B1 shorts segment 10 with segment 1, the coil (marked with a circle ○) starting from S1, winding on tooth T5 and extending to S10 becomes inactive. However, brush B2 contacts with only segment S3, and thus brush B2 does not short with the adjacent segments. As a result, a production of inactive coils remains at a lower level than the conventional case.

If a brush's length (arc-length) contacting with the commutator in the rim direction is defined not more than 5% (not more than $\pi \times A/20$, where A is an outside diameter of the commutator) of the outer rim length of the commutator, a number of the shorts between the brushes and segments caused by a rotor position can be reduced. Because when either one of the brushes shorts two segments, the other brush contacts with only one segment. Thus the reduction in active conductors can be prevented.

The winding method for the motor in accordance with the first embodiment is illustrated in FIG. 3, which shows a schematic development of the windings of the motor.

In FIG. 3, a first coil starting from first segment S5 is wound on first tooth T3 closest to S5, and is connected to second segment S6 adjacent to S5. A second coil starting from second segment S6 is wound on second tooth T2 adjacent to first tooth T3 in the reversal winding direction to the first coil. Then the second coil is connected to third segment S1 corresponding to first segment S5 with respect to third tooth T3 adjacent to second tooth T2.

FIG. 4 further details this winding method shown in FIG. 3. In FIG. 4, the mark of × in a circle represents that the winding runs from front side of the paper to behind the paper (e.g., clockwise viewed from the paper surface), and the mark of • in a circle represents that the winding runs from behind the paper to front side of the paper (e.g., counterclockwise viewed from the paper surface). Segments 1–10 are simply marked with the corresponding numbers 1–10. A first coil starting from first segment S5 (5) is wound in plural turns on first tooth T3 closest to segment S5 (5) in the winding direction marked with the symbol discussed above. Then the first coil is connected to second segment S6 (6) adjacent to segment S5 (5). A second coil starting from segment S6 (6) is wound in plural turns on second tooth T2 adjacent to tooth T3 in the reversal direction to that of the first coil. Then the second coil is connected to third segment S1 (1) corresponding to the first segment S5 (5) with respect to third tooth T1 adjacent to tooth T2. This winding is applied to all the segments, thereby completing the motor windings.

In FIG. 5, all the segments are provided with the windings discussed above and shown in FIG. 3, and a dimensional as well as a positional relation between the brushes and the commutator is applied. Electrical condition of respective coils in FIG. 5 is described hereinafter. Brush B1 with a positive voltage contacts with both segments S1 and S10. Brush B2 with a negative voltage contacts with only segment S3. A first current runs from B1, through S1, around T4, through S6, around T3, through S7, around T2, through S2, around T1, through S3 and arrives at B2. A second current runs from B1, through S10, around T1, through S5, around T2, through S4, around T3, through S9, around T4, through S8, around T5, through S3 and arrives at B2. Current does not run through the coil (marked with a circle) wound on tooth T5 and disposed between S1 and S10.

As discussed above, when brush B1 shorts S1 with S10, and the other brush B2 contacts with only S3 as shown in FIG. 5, a number of inactive coils (marked with a circle) is less than that in the conventional case shown in FIG. 8. This fact proves that the reduction in active conductors is distinctively less than the conventional case.

As shown in FIG. 2 and FIG. 5, the motor in accordance with the first embodiment can minimize a number of segments shorted by the brush, thereby preventing a number of active conductors from decreasing. Further, the motor can prevent as much as possible the current running through the coils within one slot from running in a reversal direction. As a result, the motor can be downsized and light-weighted substantially without lowering the output.

Second Exemplary Embodiment

Figure 6:
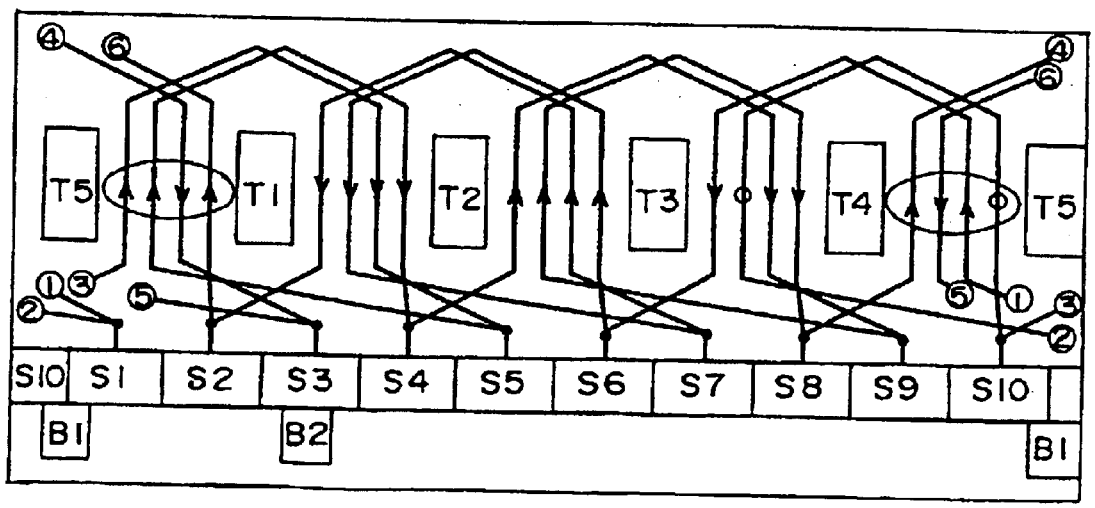
FIG. 6 shows a schematic development of a rotor of a motor, in accordance with a second exemplary embodiment of the present invention, where a dimensional relation between a brush and a commutator of the present invention is applied to a rotor wound by a conventional winding method.
Figure 9:
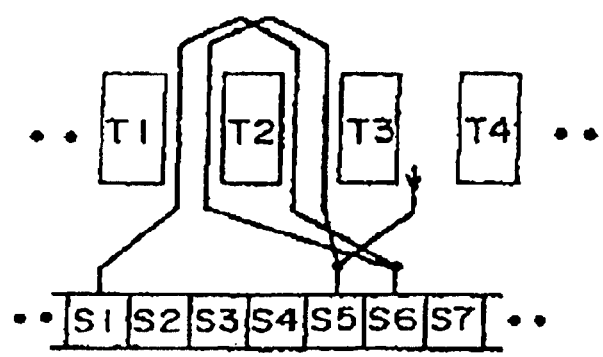
FIG. 9 shows a schematic development of windings of the conventional motor shown in FIG. 8.

FIG. 6 is a schematic development of a rotor in accordance with the second exemplary embodiment of the present invention. In this rotor, a dimensional relation between a brush and a commutator of the present invention is employed; however, the conventional winding method still remains. FIG. 9 is a schematic development of windings of a conventional motor, and this winding method is employed in the second embodiment. In FIG. 9, a coil starting from segment S5 is wound on tooth T2, and coupled to segment S6 adjacent to segment S5. The coil extending from segment S6 is wound on tooth T2, then connected to segment S1. This coil connection is applied to all the segments of the rotor shown in FIG. 6, and the dimensional relation between the brush and the commutator in accordance with the second embodiment is applied to this rotor.

In this second embodiment, the conventional winding method shown in FIG. 9 can work with the dimensional relation between the brush and the commutator of the present invention such that even when one brush B1 shorts segments S1 to S2, the other brush B2 contacts with only segment S3 as shown in FIG. 6.

The current routes of respective coils shown in FIG. 6 are as follows: In FIG. 6, brush B1 is applied with a positive voltage, and contacts with both of segments S1 and S10. Brush B2 is applied with a negative voltage and contacts with only segment S3. A first current starts from brush B1, and runs through S1, around T4, through S6, around T2, through S7, around T2, through S2, around T5, through S3 and arrives at brush B2. A second current starts from brush B1, runs through S10, around T1, through S5, around T1, through S4, around T3, through S9, around T3, through S8, around T5, through S3 and arrives at brush B2. No current runs through the coil (marked with a circle ○) wound on T4 and disposed between S1 and S10.

The second embodiment illustrated in FIG. 6 has less numbers of in-active coils (marked with a circle ○), so that the second embodiment is encountered with less reduction of active coils than the conventional case illustrated in FIG. 8. As a result, a more efficient motor than a conventional one can be expected by the second embodiment.

When the second embodiment shown in FIG. 6 is compared with the first embodiment shown in FIG. 5, in the slots circled with ovals, current runs in a reverse direction through some of the coils, which are found in greater numbers in the second embodiment than in the first embodiment. In other words, the first embodiment has less reduction in active conductors, i.e., the motor of the first embodiment can produce a greater output with a greater number of active conductors if the physical size is the same as the motor of the second embodiment. Further, at every rotational position of the rotor, a less number of slots, through which inverse current runs, exist in the winding method shown in FIG. 3 than that shown in FIG. 9.

Third Exemplary Embodiment

Figure 7:
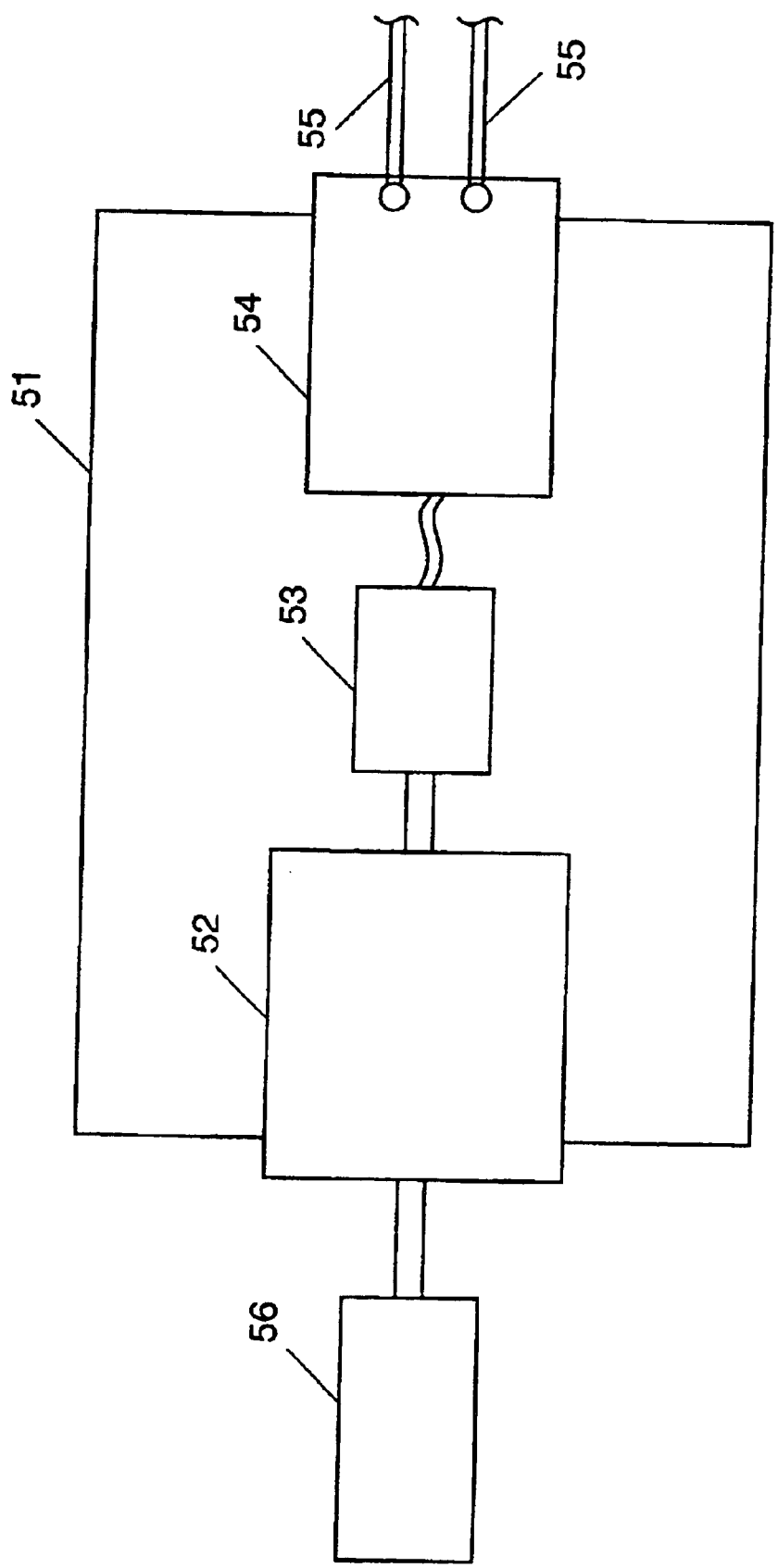
FIG. 7 shows a structure of an electric apparatus in accordance with a third exemplary embodiment of the present invention.

FIG. 7 shows a structure of an electric apparatus in accordance with the third exemplary embodiment of the present invention. In FIG. 7, the electric apparatus includes the following elements: (a) housing 51, (b) motor 53 mounted in housing 51; (c) mechanical section 52 driven by motor 53; and (d) a power supply 54 powered via outside power lines 55.

Motor 53 is driven by power supply 54 via lead wires. Rotating torque is transmitted to mechanical section 52 via an output shaft of motor 53, and mechanical section 52 works to load 56. The motor in accordance with the embodiments discussed previously is used as motor 53.

To be more specific, the electric apparatus is, e.g., automotive products mounted to an automobile, or an electric tool. A power window, which electrically opens or closes a car window, is one of good applications. In this case, housing 51 corresponds to a car body or a car door, power supply 54 corresponds to a battery mounted in the car, mechanical section 52 does to a window opening mechanism, and load 56 does to a window. A radiator of the car is another good application. In this case, housing 51 corresponds to the car body, power supply 54 does to the battery mounted to the car, and mechanical section 52 and load 56 correspond to a cooling blower.

As the electric tool, an electric driver is a good application. In this case, power supply 54 rectifies, smoothes an ac voltage supplied from the outside commercial power source, in order to convert the ac voltage to a dc voltage, and powers motor 53. Mechanical section 52 reduces the r.p.m of the output shaft of motor 53 driven by power supply 54, i.e., increases the torque. Load 56 corresponds to, e.g., screws tightened into a board by the electric driver as an output shaft of mechanical section 52. Power supply 54 can be a rechargeable battery.

As discussed above, various electric apparatus employ the motor of the present invention, and the motor can be substantially downsized and light-weighted from the conventional motor without reducing its output. Therefore, the electric apparatus employing this motor can be also substantially downsized and light-weighted.

INDUSTRIAL APPLICABILITY

An arc length—contacting with a commutator—of two brushes in a rotational direction of a motor is defined as not more than 5% of an outer rim length of the commutator, i.e., not more than $\pi \times A/20$, where A is an outside diameter of the commutator. A number of shorted segments of the commutator—the short is caused by the brush—is minimized, so that reduction in output of the motor can be prevented. As a result, the motor employed in a car product or an electric tool can be downsized and light-weighted.

What is claimed is:

1. A motor comprising:
   (a) a stator including four magnetic poles;
   (b) a rotor including:

(b-1) a core having five teeth;
(b-2) a commutator having 10 segments;
(b-3) coils wound on the teeth via connections to the segments; and (c) a pair of brushes orthogonal to each other and brought into contact with the commutator,
wherein an arc length in contact with the commutator of the brushes in the rotational direction is defined as not more than 5% of an outer circumference of the commutator.

2. The motor of claim 1, wherein;
a first coil starting from a first segment of the ten segments is wound on a first tooth closest to the first segment, then coupled to a second segment of the ten segments adjacent to the first segment, and
a second coil starting from the second segment is wound on the second tooth adjacent to the first tooth in an opposite direction to the first coil, then coupled to a third segment of a third tooth adjacent to the second tooth, the third segment corresponding to the first segment.

3. An electric apparatus comprising:
(a) a housing;
(b) a motor mounted to the housing; said motor including:
(b-i) a stator including four magnetic poles;
(b-2) a rotor including:
a core having five teeth;
a commutator having 10 segments;
coils wound on the teeth via connections to the segments;
(b-3) a pair of brushes orthogonal to each other and brought into contact with the commutator,
wherein an arc length in contact with the commutator of the brushes in the rotational direction is defined as not more than 5% of an outer circumference of the commutator; and (c) a mechanical section driven by said motor.

4. The electric apparatus of claim 3, wherein;
a first coil staring from a first segment of the ten segments of said motor is wound on a first tooth closest to the first segment, then coupled to a second segment of the ten segments adjacent to the first segment, and
a second coil starting from the second segment is wound on the second tooth adjacent to the first tooth in an opposite direction to the first coil, then coupled to a third segment of a third tooth adjacent to the second tooth, the third segment corresponding to the first segment.

* * * * *